United States Patent
Lewis et al.

(10) Patent No.: US 10,239,631 B2
(45) Date of Patent: Mar. 26, 2019

(54) AIRCRAFT RECEPTACLE

(71) Applicant: The Boeing Company, Chicago, IL (US)

(72) Inventors: Brian Lewis, Seattle, WA (US); Bruce M. Whiteman, Mukilteo, WA (US); Christopher Mark Alley, Seattle, WA (US)

(73) Assignee: The Boeing Company, Chicago, IL (US)

( * ) Notice: Subject to any disclaimer, the term of this patent is extended or adjusted under 35 U.S.C. 154(b) by 548 days.

(21) Appl. No.: 14/797,796

(22) Filed: Jul. 13, 2015

(65) Prior Publication Data

US 2016/0376020 A1      Dec. 29, 2016

Related U.S. Application Data

(60) Provisional application No. 62/048,575, filed on Sep. 10, 2014.

(51) Int. Cl.
*B64D 39/06* (2006.01)
(52) U.S. Cl.
CPC .................... *B64D 39/06* (2013.01)
(58) Field of Classification Search
CPC ..................................................... B64D 39/06
USPC ..................................................... 244/135 A
See application file for complete search history.

(56) References Cited

U.S. PATENT DOCUMENTS

| | | | | |
|---|---|---|---|---|
| 2,634,927 A | * | 4/1953 | Smith | B64D 39/00 244/135 A |
| 2,946,605 A | * | 7/1960 | Mosher | B64D 39/06 137/614.03 |
| 3,319,978 A | * | 5/1967 | Melhose | F42B 15/36 102/377 |
| 3,352,332 A | * | 11/1967 | Swatek | B64D 39/06 137/614.04 |
| 3,475,001 A | * | 10/1969 | Hieber | B64D 39/06 137/614.03 |
| 3,851,852 A | * | 12/1974 | Blanchard | B64D 39/06 137/614.04 |
| 3,976,100 A | * | 8/1976 | Souslin | B64D 39/06 137/599.01 |
| 4,126,162 A | * | 11/1978 | Clark | B64D 39/06 141/231 |
| 4,438,793 A | * | 3/1984 | Brown | B64D 39/06 141/346 |
| 4,885,981 A | | 12/1989 | Roettger et al. | |
| 9,193,471 B2 | * | 11/2015 | Fernandez Garcia | B64D 39/06 |

* cited by examiner

*Primary Examiner* — Brian M O'Hara
*Assistant Examiner* — Keith L Dixon
(74) *Attorney, Agent, or Firm* — Yee & Associates, P.C.

(57) ABSTRACT

A system and method for an aircraft receptacle. The aircraft receptacle comprises an actuator connected to a number of latches and a tension spring connected to the number of latches. The actuator is part of an actuation system. The elastic member holds the number of latches in a disengaged position after failure of the actuation system.

21 Claims, 11 Drawing Sheets

AIRCRAFT RECEPTACLE

RELATED PROVISIONAL APPLICATION

This application claims the benefit of U.S. Provisional Patent Application Ser. No. 62/048,575, filed Sep. 10, 2014, and entitled "Aircraft Receptacle."

GOVERNMENT LICENSE RIGHTS

This application was made with United States Government support under contract number FA8625-11-C-6600 with PA 3349 for the BCA/BDS 767 awarded by the United States Department of Defense. The United States Government has certain rights in this application.

This technical information requires an export license prior to dissemination to foreign persons. It is controlled by United States International Traffic in Arms Regulations (ITAR) (22 CFR 120130). It is the responsibility of each individual in control of this data to abide by all export laws.

BACKGROUND INFORMATION

1. Field

The present disclosure relates generally to aircraft receptacles. The present disclosure relates more particularly to methods and apparatuses for aerial refueling. Still more particularly, the present disclosure relates to a refueling receptacle.

2. Background

An aircraft in flight may be refueled from a refueling aircraft. Many refueling aircraft use a system of fixed and extendable tubing, often referred to as a refueling boom, for refueling a receiving aircraft. A distal end of the refueling boom may be extendable to allow the operator to extend the refueling boom into engagement with the refueling receptacle.

The refueling receptacle of the receiving aircraft accepts the distal end of the refueling boom. When the distal end of the refueling boom is inserted into a boom cavity of the refueling receptacle, the refueling receptacle connects to the refueling boom using a number of latches. When refueling, the latches are placed in an engaged position. Following refueling, the latches are placed into a disengaged position.

The latches are changed between the engaged position and disengaged position using an actuation system. When the actuation system does not operate desirably, the latches may be undesirably held in the engaged position. When the latches are held in the engaged position, insertion of a refueling boom may be physically obstructed. As a result, refueling during flight may be undesirably prevented.

Therefore, it would be desirable to have a method and apparatus that take into account at least some of the issues discussed above, as well as other possible issues.

SUMMARY

An illustrative embodiment of the present disclosure provides an aircraft receptacle. The aircraft receptacle comprises an actuator connected to a number of latches and an elastic member connected to the number of latches. The actuator is part of an actuation system. The elastic member holds the number of latches in a disengaged position after failure of the actuation system Another illustrative embodiment of the present disclosure provides an aircraft refueling receptacle system. The aircraft refueling receptacle system comprises an aircraft refueling receptacle that engages a refueling boom during flight despite an actuation system failure. A further illustrative embodiment of the present disclosure provides a method. The method comprises controlling a number of latches of an aircraft refueling receptacle between an engaged position and a disengaged position with an actuation system. The method also maintains the number of latches in the disengaged position by an elastic member responsive to the actuation system failing.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that the volume provided for a refueling system within a receiving aircraft is limited. Specifically, a refueling receptacle is positioned within a fuselage such that a refueling boom may reach the refueling receptacle. The refueling receptacle may have a limited volume within the fuselage.

Further, the illustrative embodiments recognize and take into account that it is desirable to reduce the weight of aircraft. Specifically, increasing the weight of an aircraft may increase operating costs of the aircraft.

The illustrative embodiments also recognize and take into account that it may be desirable to refuel a receiving aircraft in an aerial refueling environment despite an actuation system failure. Specifically, the illustrative embodiments further recognize and take into account that it may be desirable to refuel a receiving aircraft in an aerial refueling environment without securing a refueling boom using a number of latches.

The illustrative embodiments also recognize and take into account that it may be desirable to hold a number of latches of other types of receptacles in a disengaged position despite an actuation system failure. As a result, the illustrative embodiments recognize and take into account that a variety of types of receptacles may use disclosed examples to hold a number of latches in a disengaged position despite an actuation system failure.

Figure 1:
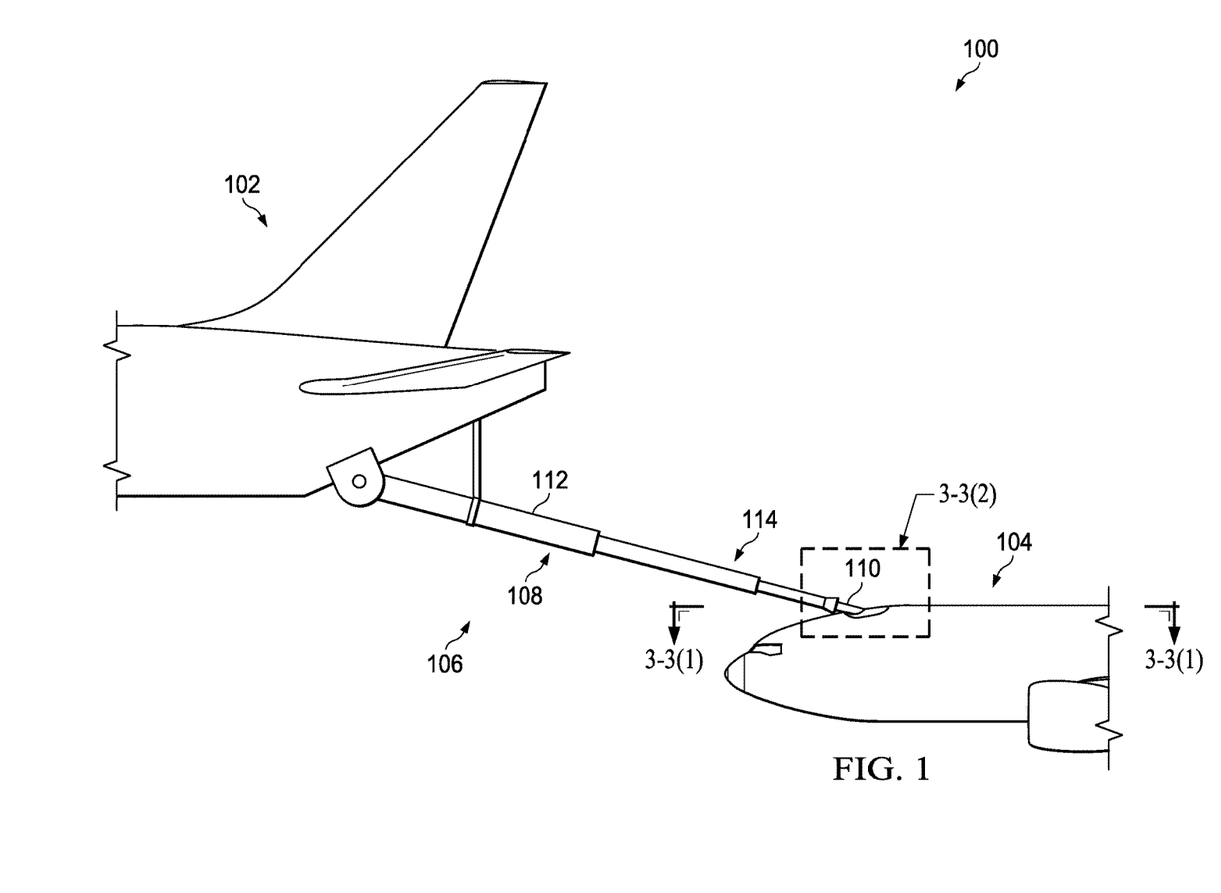
FIG. 1 is an illustration of a side view of an aerial refueling environment in accordance with an illustrative embodiment.

With reference now to the figures, and in particular, with reference to FIG. 1, an illustration of a side view of an aerial refueling environment is depicted in accordance with an illustrative embodiment. As depicted, aerial refueling environment 100 includes refueling aircraft 102 and receiving aircraft 104. Refueling aircraft 102 may also be referred to as a tanker. Refueling aircraft 102 is equipped with in-flight refueling assembly 106 that includes refueling boom 108. Refueling boom 108 is configured to be guided into alignment with refueling receptacle 110 of receiving aircraft 104. Refueling boom 108 includes base portion 112 and extendable portion 114 that may be extended into engagement with refueling receptacle 110, fluidly coupling refueling aircraft 102 and receiving aircraft 104.

This illustration of aerial refueling environment 100 is provided for purposes of illustrating one environment in which the different illustrative embodiments may be implemented. The illustration of aerial refueling environment 100 in FIG. 1 is not meant to imply architectural limitations as to the manner in which different illustrative embodiments may be implemented. For example, receiving aircraft 104 is shown as a commercial passenger aircraft. The different illustrative embodiments may be applied to other types of aircraft, such as private passenger aircraft, military aircraft, and other suitable types of aircraft.

Figure 2:
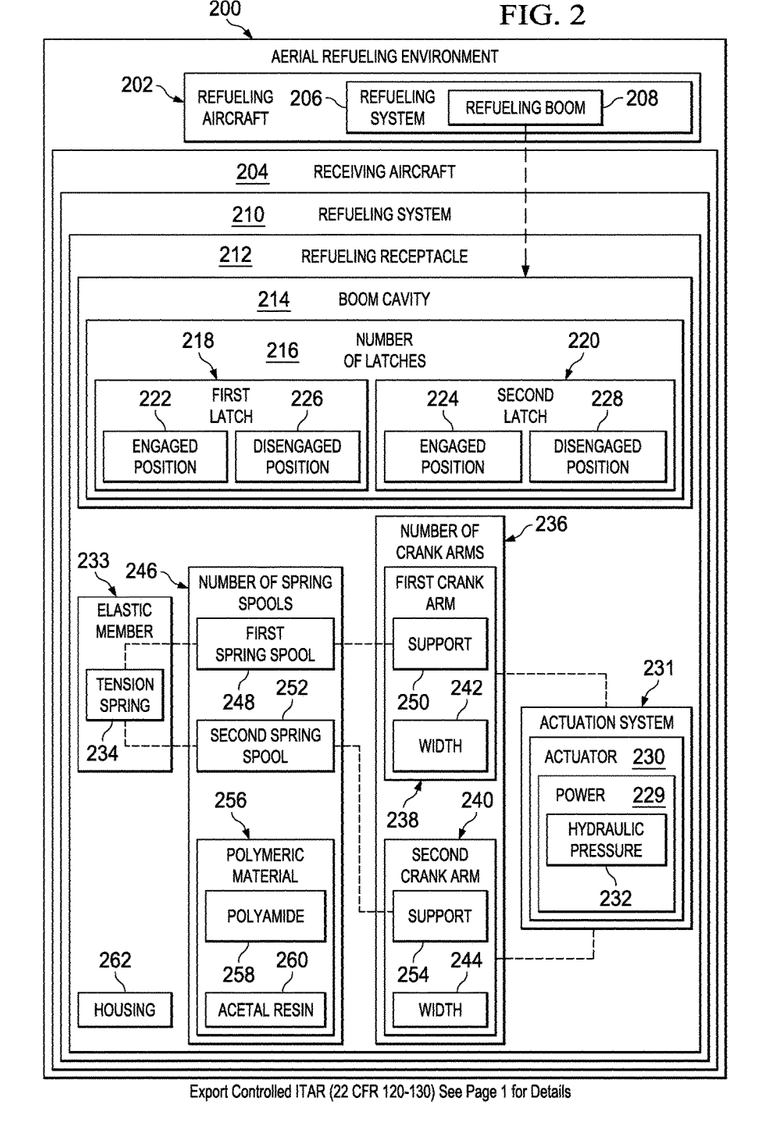
FIG. 2 is an illustration of a block diagram of an aerial refueling environment in accordance with an illustrative embodiment.

Turning now to FIG. 2, an illustration of a block diagram of an aerial refueling environment is depicted in accordance with an illustrative embodiment. Aerial refueling environment 100 of FIG. 1 may be a physical implementation of aerial refueling environment 200.

As depicted, aerial refueling environment 200 includes refueling aircraft 202 and receiving aircraft 204. Refueling aircraft 202 has refueling system 206 including refueling boom 208. To refuel receiving aircraft 204, refueling boom 208 is extended from refueling aircraft 202 to refueling system 210 of receiving aircraft 204. Refueling boom 208 is aligned with refueling receptacle 212. Refueling boom 208 is inserted into boom cavity 214 of refueling receptacle 212. Number of latches 216 then interacts with refueling boom 208 to hold refueling boom 208 within refueling receptacle 212 during an aerial refueling operation.

As used herein, "a number of," when used with reference to items, means one or more items. As depicted, number of latches 216 includes first latch 218 and second latch 220. When in engaged position 222, first latch 218 extends at least partially into boom cavity 214. When in engaged position 222, first latch 218 engages refueling boom 208. When in engaged position 224, second latch 220 extends at least partially into boom cavity 214. When in engaged position 224, second latch 220 engages refueling boom 208. First latch 218 and second latch 220 hold refueling boom 208 within refueling receptacle 212 when in engaged position 222 and engaged position 224, respectively.

First latch 218 does not engage refueling boom 208 when in disengaged position 226. First latch 218 may not extend into boom cavity 214 when in disengaged position 226. Second latch 220 does not engage refueling boom 208 when in disengaged position 228. Second latch 220 may not extend into boom cavity 214 when in disengaged position 228. Refueling boom 208 may be inserted into or removed from boom cavity 214 when first latch 218 and second latch 220 are in disengaged position 226 and disengaged position 228, respectively. Refueling boom 208 may be restricted from being inserted into boom cavity 214 should first latch 218 and second latch 220 be in engaged position 222 and engaged position 224, respectively, when boom cavity 214 is empty.

In a powered state, during operation of refueling receptacle 212, first latch 218 and second latch 220 are operated using actuator 230. Actuator 230 is part of actuation system 231. Power 229 for actuator 230 may be any suitable powered actuation means, such as hydraulic pressure 232, pneumatic, electrical, or other desirable power. In one illustrative example, actuation system 231 may provide hydraulic pressure 232 to actuator 230. Actuator 230 moves first latch 218 between engaged position 222 and disengaged position 226 using hydraulic pressure 232. Specifically, hydraulic pressure 232 may hold first latch 218 in disengaged position 226. Actuator 230 moves second latch 220 between engaged position 224 and disengaged position 228 using hydraulic pressure 232. Specifically, hydraulic pressure 232 may hold second latch 220 in disengaged position 228.

In an un-powered state, power 229 may not be present or may be insufficient, such as when there is a failure in actuation system 231. A failure in actuation system 231 may be in actuator 230 or another portion of actuation system 231 due to loss of power 229. In an unpowered state, when power 229 is not present, or insufficient, actuator 230 may not hold first latch 218 and second latch 220 in disengaged position 226 and disengaged position 228, respectively. When unpowered, power 229 is not present, or insufficient, elastic member 233 biases first latch 218 and second latch 220 to disengaged position 226 and disengaged position 228, respectively. In some illustrative examples, elastic member 233 takes the form of tension spring 234. When power 229 is not present, or insufficient, refueling operations may be performed with first latch 218 and second latch 220 in disengaged position 226 and disengaged position 228, respectively. These refueling operations may be performed as pressure refueling operations. During pressure refueling, pressure of refueling boom 208 against refueling receptacle 212 holds refueling boom 208 within boom cavity 214.

Actuator 230 is connected to number of latches 216 to change number of latches 216 between an engaged position and a disengaged position. As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

Actuator 230 is connected to number of latches 216 through number of crank arms 236. As depicted, number of crank arms 236 includes first crank arm 238 and second crank arm 240. In some illustrative examples, first crank arm 238 is directly connected to a first side of actuator 230. In these illustrative examples, second crank arm 240 is directly connected to a second side of actuator 230.

First crank arm 238 has width 242. Second crank arm 240 has width 244. Width 242 and width 244 are larger than a width of crank arms of conventional refueling receptacles. Width 242 and width 244 are larger than a width of crank arms of conventional refueling receptacles to increase the strength of first crank arm 238 and second crank arm 240. Increased strength may support forces of elastic member 233.

When elastic member 233 takes the form of tension spring 234, number of spring spools 246 may interface with number of crank arms 236. Specifically, as depicted, first spring spool 248 may be connected to support 250 of first crank arm 238. Also as depicted, second spring spool 252 may be connected to support 254 of second crank arm 240. Number of spring spools 246 may be formed of polymeric material 256. In some illustrative examples, polymeric material 256 may be selected from at least one of polyamide 258 or acetal resin 260. An example of polyamide 258 may be a nylon material. An example of acetal resin 260 may be Delrin® acetal resin.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

Elastic member 233 is connected to number of latches 216 through number of crank arms 236. Elastic member 233 holds number of latches 216 in a disengaged position after failure of actuation system 231. Specifically, elastic member 233 is connected to a number of supports integral to number of crank arms 236. Specifically, elastic member 233 is connected to support 250 which is integral to first crank arm 238 and support 254 which is integral to second crank arm 240.

When elastic member 233 takes the form of tension spring 234, tension spring 234 is connected to the number of supports by number of spring spools 246. Number of spring spools 246 may hold tension spring 234 in place relative to support 250 and support 254. Number of spring spools 246 may allow tension spring 234 to rotate around support 250 and support 254 without torsional loads. Number of spring spools 246 may allow tension spring 234 to rotate around support 250 and support 254 with minimal wear.

In some illustrative examples, housing 262 substantially surrounds elastic member 233. Housing 262 may prevent items from becoming trapped by elastic member 233. Housing 262 may form a clear path for movement of elastic member 233 as actuator 230 moves number of crank arms 236 to change the position of number of latches 216. Further, housing 262 may contain elastic member 233 in case of failure. Additionally, housing 262 may limit movement of elastic member 233.

As depicted, actuator 230 and elastic member 233 are connected to number of latches 216 through number of crank arms 236. In some examples, rotating number of crank arms 236 moves number of latches 216 between an engaged position and a disengaged position.

In some illustrative examples, refueling receptacle 212 may have been originally built as shown. In some other illustrative examples, refueling receptacle 212 may have been a pre-existing refueling receptacle with conventional crank arms and without elastic member 233. In other words, refueling receptacle 212 may have been retrofitted. In these examples, to receive elastic member 233, the conventional crank arms would be removed and replaced with number of crank arms 236 having integral support 250 and support 254.

Figure 3:
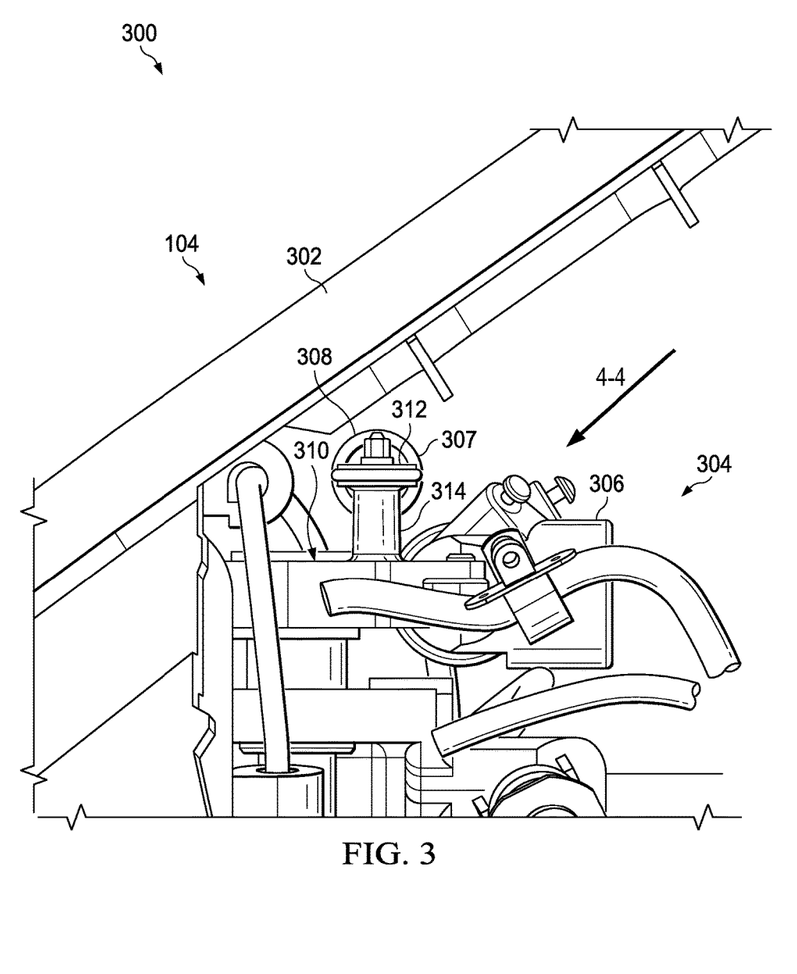
FIG. 3 is an illustration of a side view of a refueling receptacle in an aircraft in accordance with an illustrative embodiment.

Turning now to FIG. 3, an illustration of a side view of a refueling receptacle in an aircraft is depicted in accordance with an illustrative embodiment. View 300 is a cross-sectional view of receiving aircraft 104 of FIG. 1 along lines 3-3(1) and within box 3-3(2). View 300 shows fuselage 302 of receiving aircraft 104. Within fuselage 302, refueling receptacle 304 has actuator 306 and elastic member 307. As depicted, elastic member 307 takes the form of tension spring 308. As depicted, actuator 306 and tension spring 308 are connected to first crank arm 310. Tension spring 308 is connected to spring spool 312 on support 314 which is integral to first crank arm 310.

Figure 4:
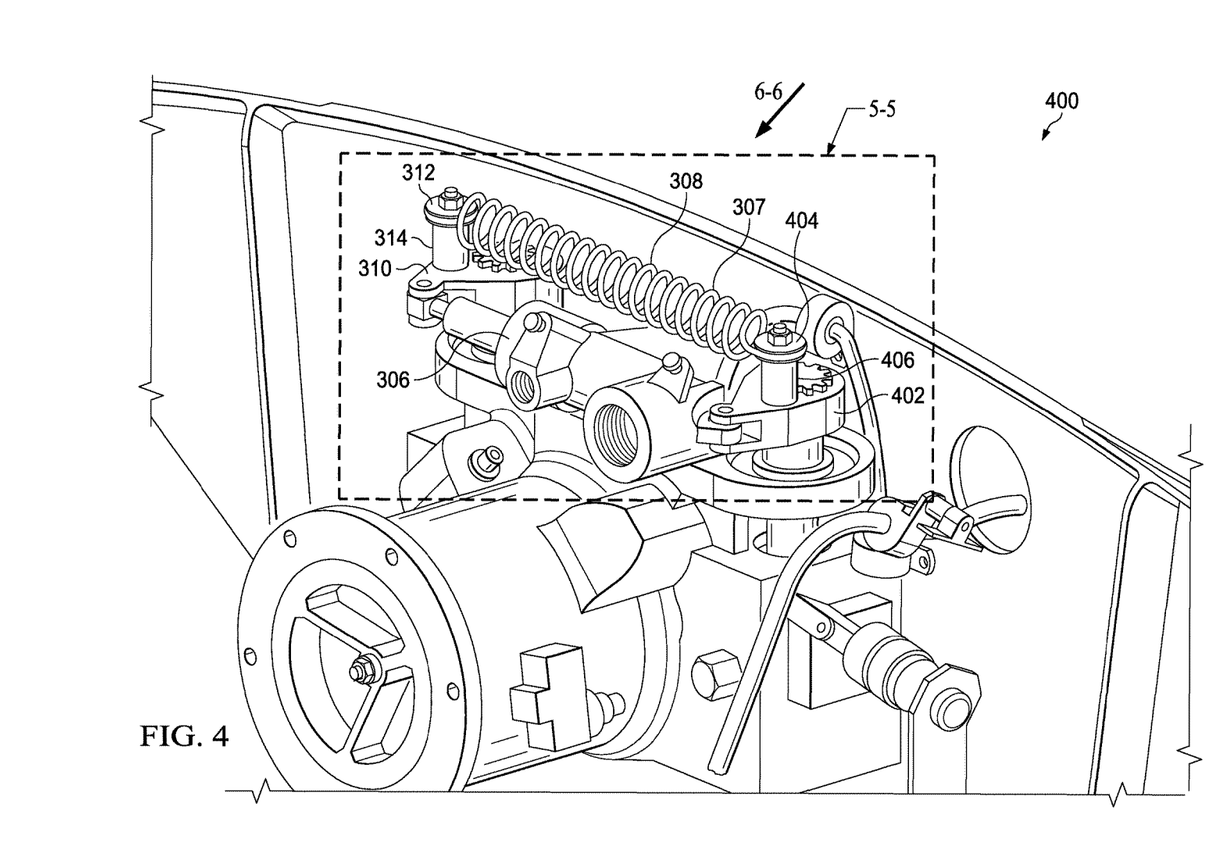
FIG. 4 is an illustration of an isometric back view of a refueling receptacle in an aircraft in accordance with an illustrative embodiment.

Turning now to FIG. 4, an illustration of an isometric back view of a refueling receptacle in an aircraft is depicted in accordance with an illustrative embodiment. View 400 is a view of refueling receptacle 304 of FIG. 3 from direction 4-4 in FIG. 3. As can be seen from view 400, actuator 306 is also connected to second crank arm 402. Tension spring 308 is also connected to second crank arm 402. Specifically, tension spring 308 is connected to spring spool 404 on support 406 which is integral to second crank arm 402.

Figure 5:
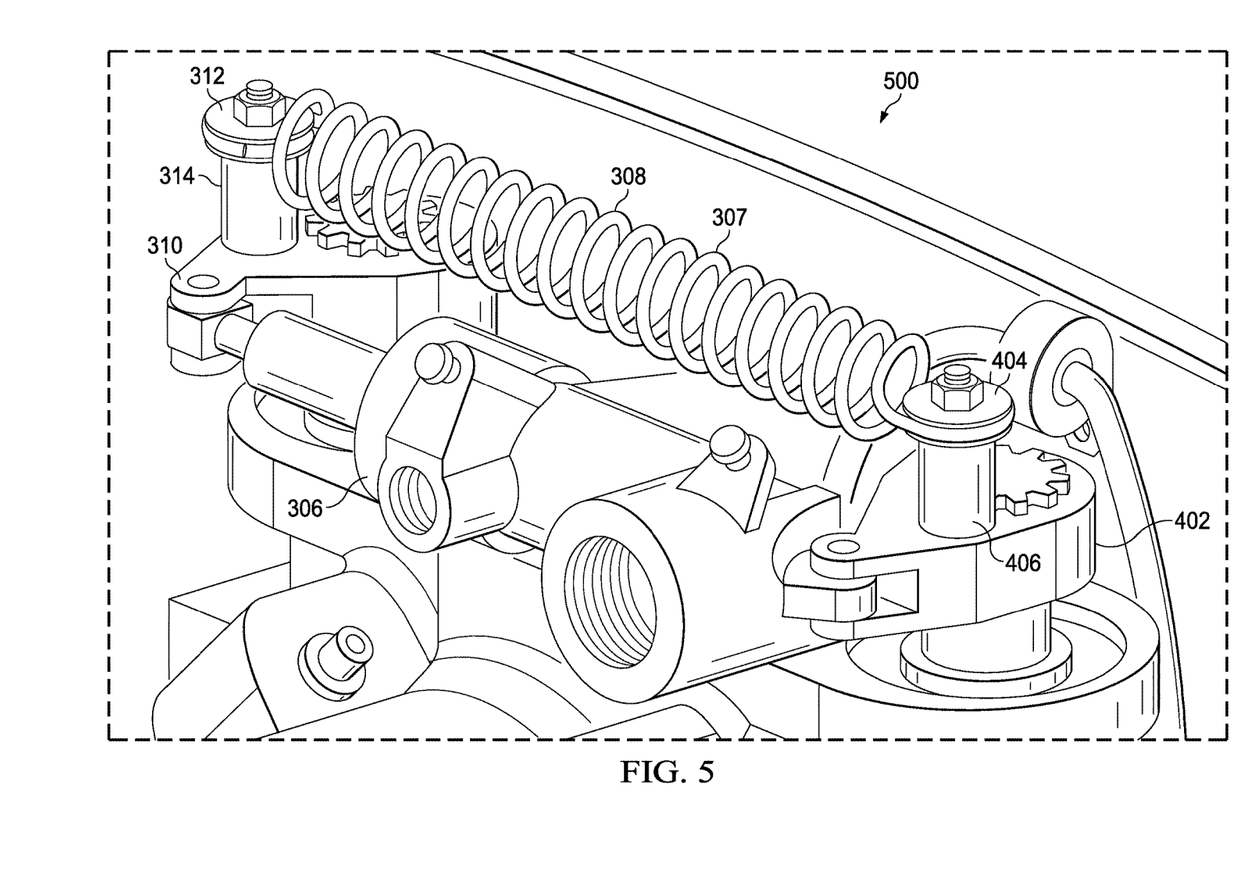
FIG. 5 is an illustration of an enlarged isometric back view of a refueling receptacle in an aircraft in accordance with an illustrative embodiment.

Turning now to FIG. 5, an illustration of an enlarged isometric back view of a refueling receptacle in an aircraft is depicted in accordance with an illustrative embodiment. View 500 is an enlarged view of refueling receptacle 304 within box 5-5 in FIG. 4.

Figure 6:
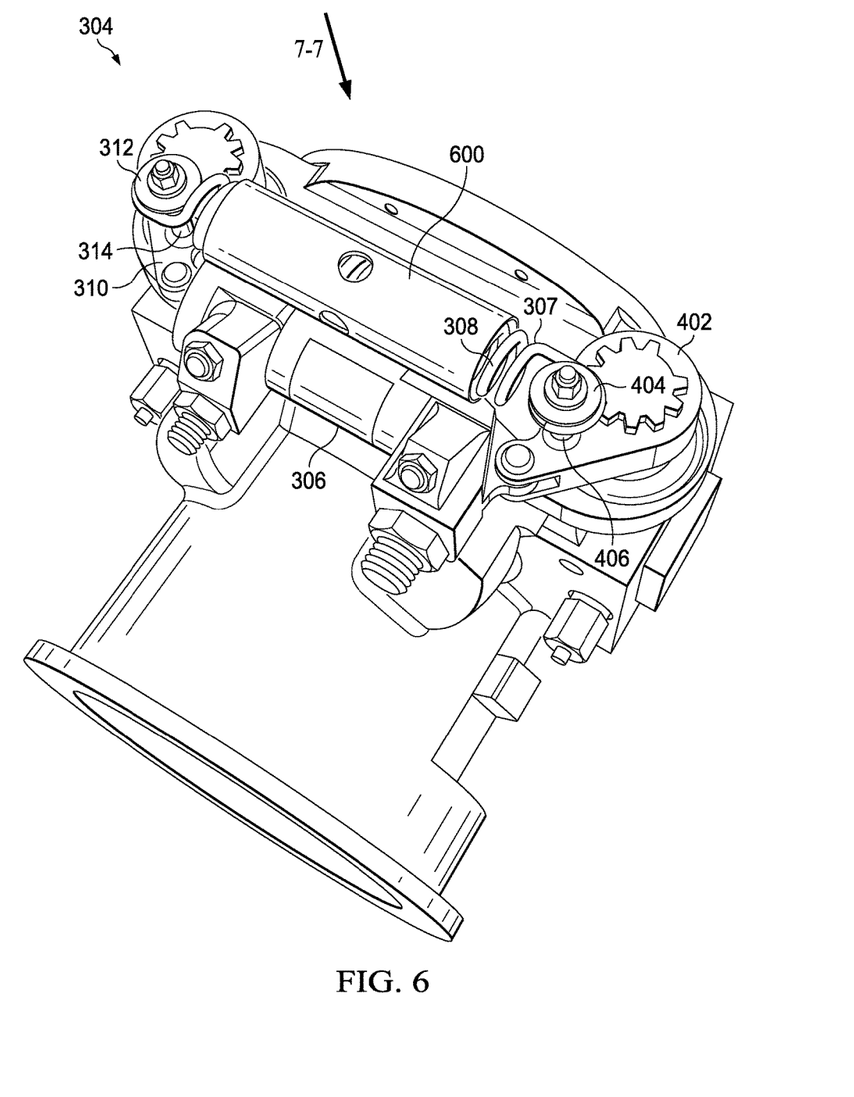
FIG. 6 is an illustration of a top view of a refueling receptacle in accordance with an illustrative embodiment.

Turning now to FIG. 6, an illustration of a top view of a refueling receptacle is depicted in accordance with an illustrative embodiment. FIG. 6 is a view of refueling receptacle 304 from direction 6-6 of FIG. 4. As depicted, refueling receptacle 304 is shown without fuselage 302 for clarification.

As previously discussed, tension spring 308 is connected to first crank arm 310 and second crank arm 402. Specifically, tension spring 308 is connected to spring spool 312. Spring spool 312 is on support 314 which is integral to first crank arm 310. Further, tension spring 308 is connected to spring spool 404. Spring spool 404 is on support 406 which is integral to second crank arm 402. Tension spring 308 biases first crank arm 310 and second crank arm 402 into the depicted positions.

As depicted, housing 600 substantially surrounds tension spring 308. Housing 600 may protect tension spring 308 from debris or other items which may impede the functioning of tension spring 308.

Figure 7:
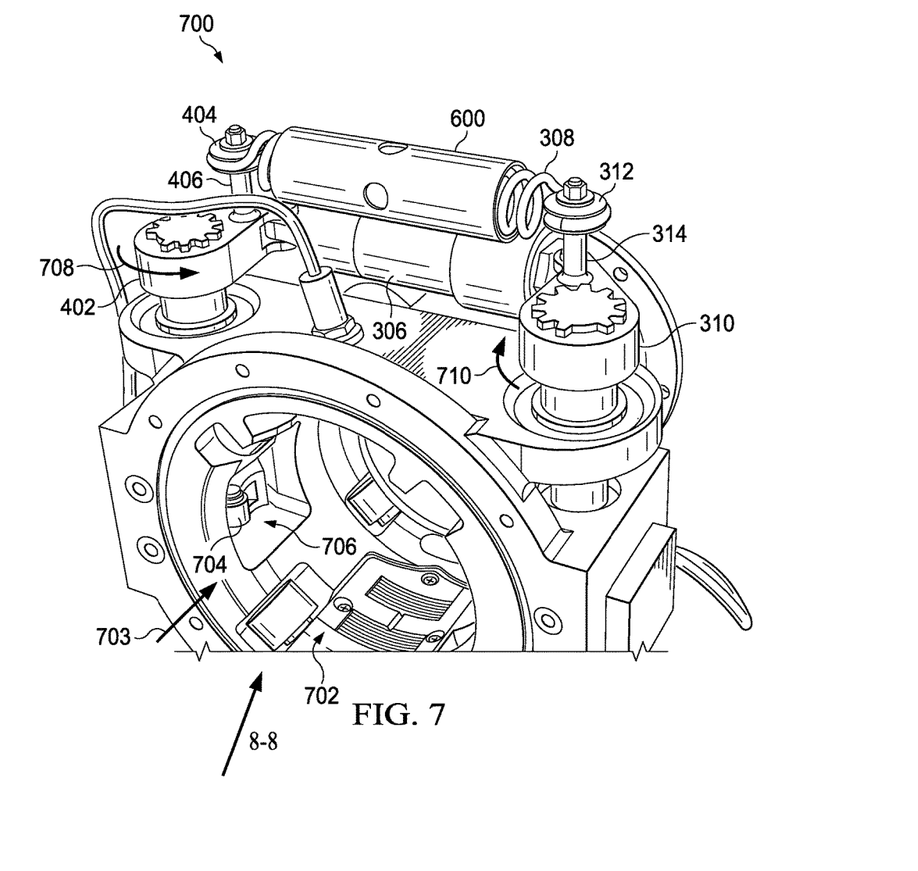
FIG. 7 is an illustration of an isometric view of a refueling receptacle in accordance with an illustrative embodiment.

Turning now to FIG. 7, an illustration of an isometric view of a refueling receptacle is depicted in accordance with an illustrative embodiment. Specifically, refueling receptacle 304 is shown from direction 7-7 of FIG. 6.

As can be seen in view 700, refueling receptacle 304 has boom cavity 702. Boom cavity 702 receives a refueling boom from a refueling aircraft from direction 703. The refueling boom may be refueling boom 208 of FIG. 2. In some illustrative examples, a physical implementation of the refueling boom may be refueling boom 1002 of FIG. 10. Within boom cavity 702, first latch 704 may interface with a refueling boom to hold the refueling boom within boom cavity 702. As depicted, first latch 704 is in disengaged position 706. In disengaged position 706, a refueling boom may be inserted into boom cavity 702.

To place first latch 704 in an engaged position, actuator 306 moves first crank arm 310 in direction 708. Likewise, actuator 306 will place a second latch in an engaged position by moving second crank arm 402 in direction 710.

Figure 8:
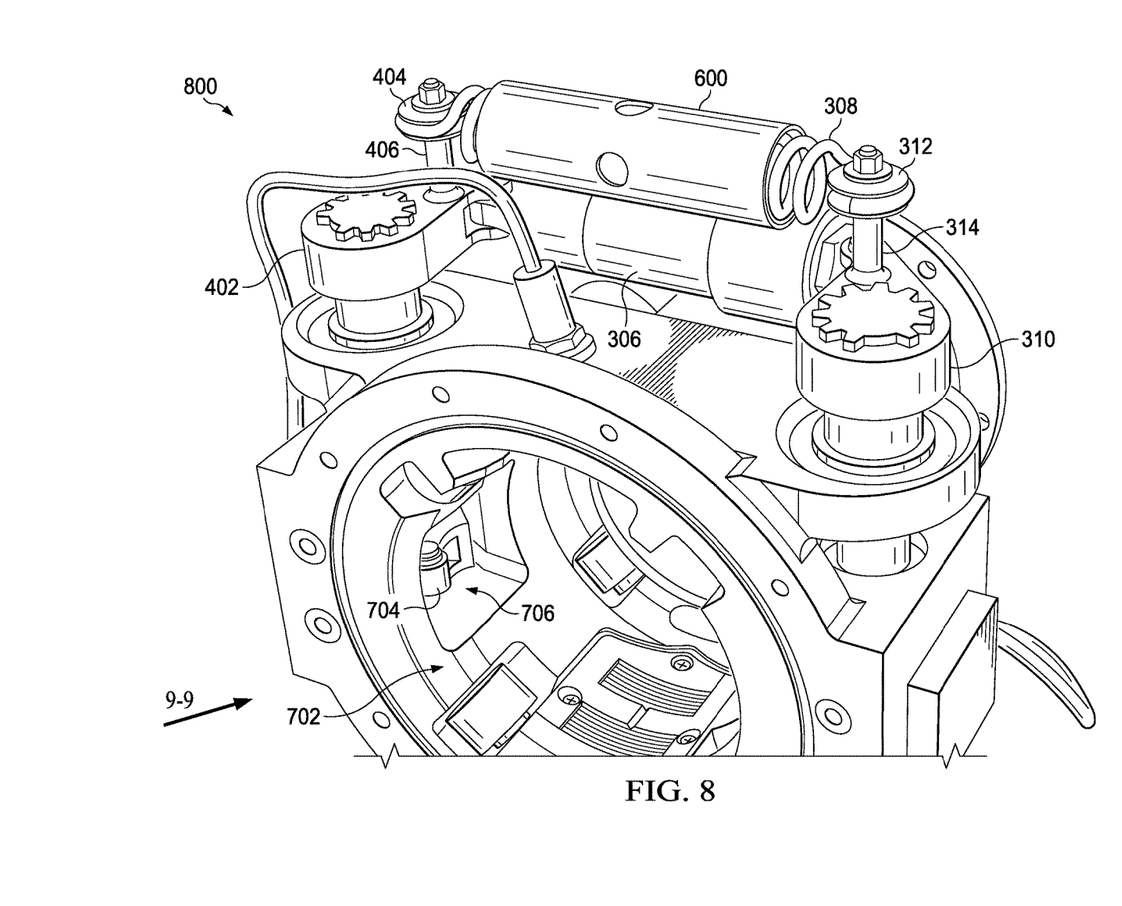
FIG. 8 is an illustration of an enlarged isometric view of a refueling receptacle in accordance with an illustrative embodiment.

Turning now to FIG. 8, an illustration of an enlarged isometric view of a refueling receptacle is depicted in accordance with an illustrative embodiment. View 800 is a depiction of refueling receptacle 304 from direction 8-8 of FIG. 7.

Figure 9:
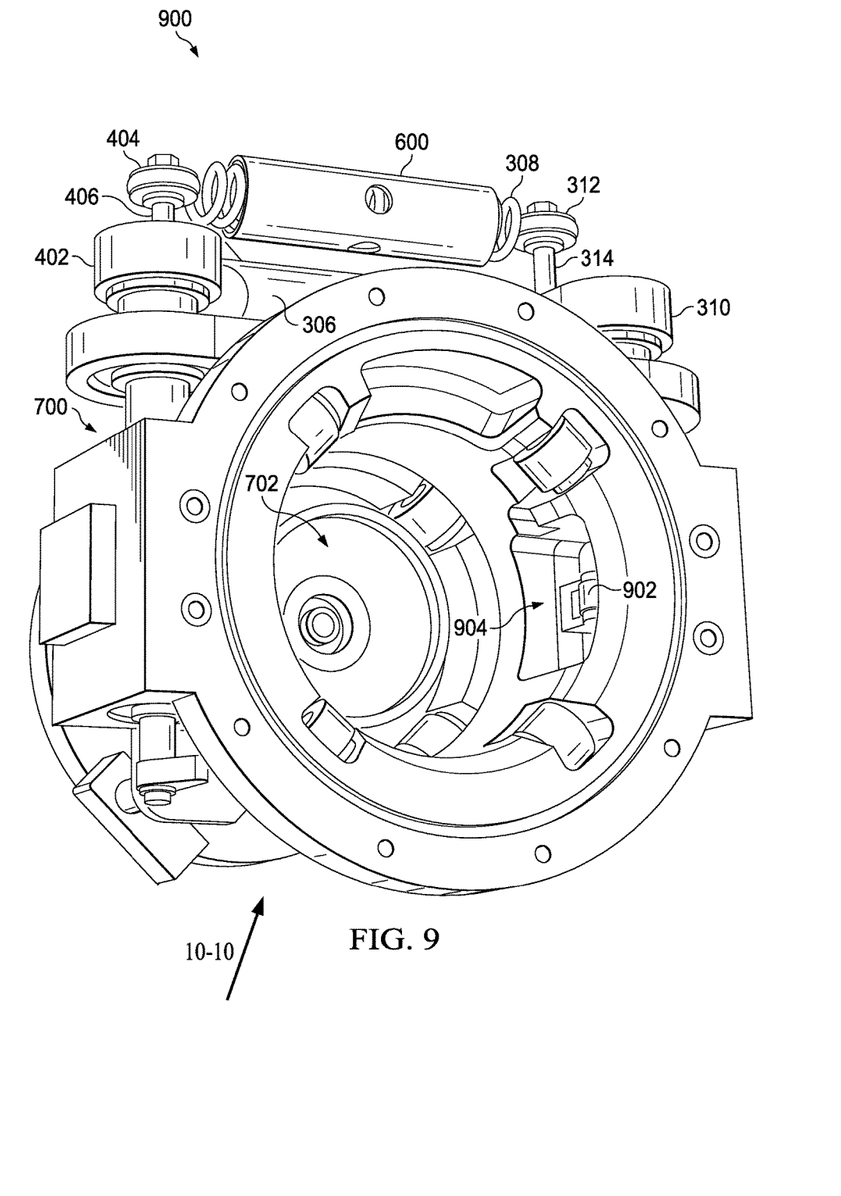
FIG. 9 is an illustration of a front view of a refueling receptacle in accordance with an illustrative embodiment.

Turning now to FIG. 9, an illustration of a front view of a refueling receptacle is depicted in accordance with an illustrative embodiment. View 900 is a depiction of refueling receptacle 304 from direction 9-9 of FIG. 8. Second latch 902 in disengaged position 904 can be seen in view 900.

Figure 10:
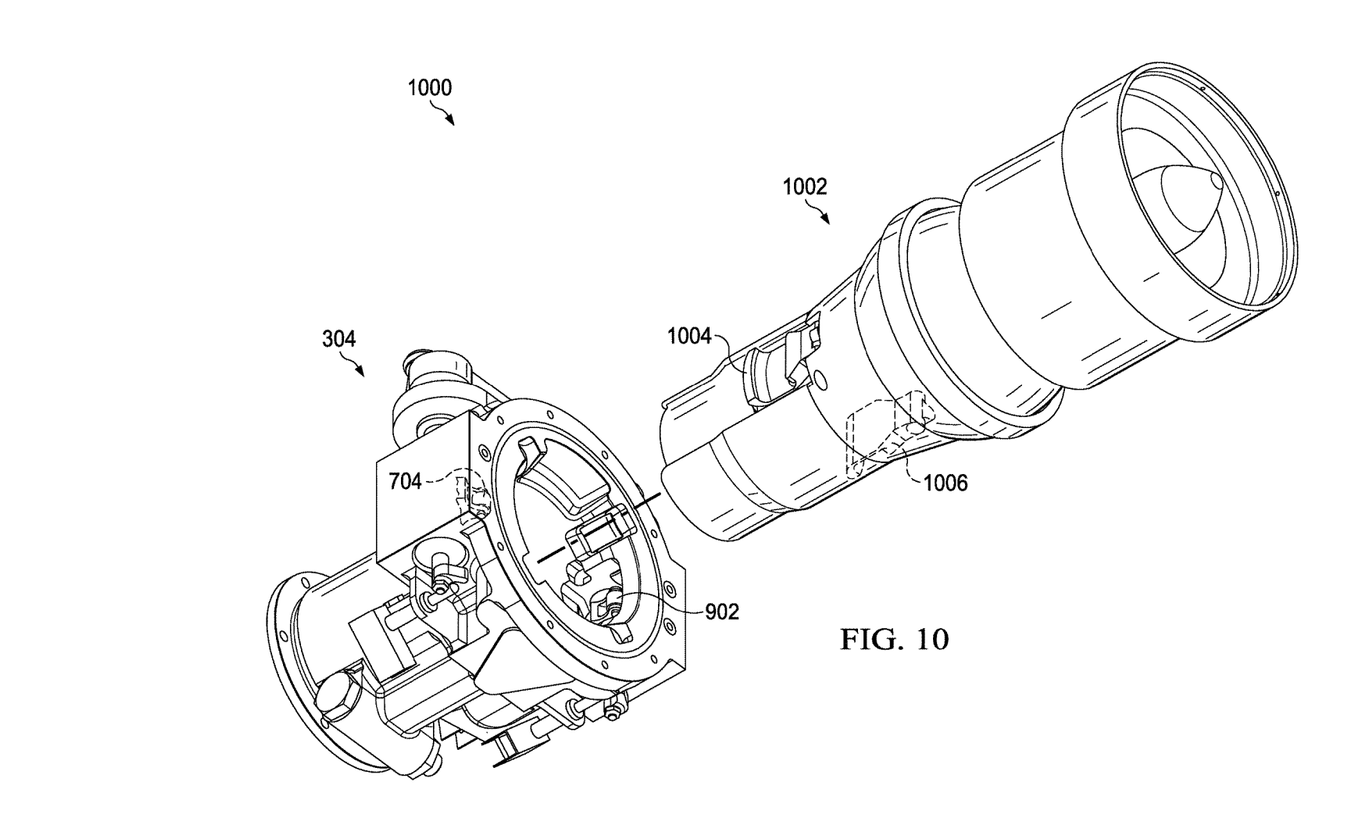
FIG. 10 is an illustration of a refueling receptacle with a refueling boom in accordance with an illustrative embodiment.

Turning now to FIG. 10, an illustration of a refueling receptacle with a refueling boom is depicted in accordance with an illustrative embodiment. View 1000 is a depiction of refueling receptacle 304 from direction 10-10 of FIG. 9 with a refueling boom. Refueling boom 1002 is a physical depiction of refueling boom 208 of FIG. 2.

As depicted, first latch 704 engages with feature 1004 of refueling boom 1002 when first latch 704 is in an engaged position. As depicted, second latch 902 engages with feature 1006 of refueling boom 1002 when second latch 902 is in an engaged position.

The illustration of aerial refueling environment 200 in FIG. 2, the refueling receptacle depictions in FIGS. 3-10, and aerial refueling environment depictions in FIG. 1 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, refueling system 210 may include additional structures in addition to refueling receptacle 212. Refueling system 210 may also include piping, a number of pumps, a number of tanks, a number of valves, or other desirable structures in addition to refueling receptacle 212. In another example, refueling receptacle 212 includes additional features not shown in FIG. 2. Refueling receptacle 212 may also include a housing, a number of fasteners, a number of crank shafts, a number of refueling boom interface components, or other desirable structures.

Further, although the examples discussed are in the context of aircraft refueling receptacles, elastic member 233 may be implemented in other types of aircraft receptacles. For example, a number of latches of one of a water receptacle, a waste receptacle, or other desirable types of receptacles may be held in a position using an elastic member, such as elastic member 233 following failure of an actuation system.

The different components shown in FIGS. 1 and 3-10 may be combined with components in FIG. 2, used with components in FIG. 2, or a combination of the two. Additionally, some of the components in FIGS. 1 and 3-10 may be illustrative examples of how components shown in block form in FIG. 2 may be implemented as physical structures.

Figure 11:
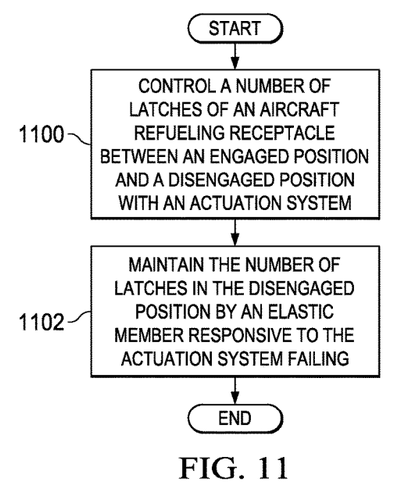
FIG. 11 is an illustration of a flowchart of a process for operating a refueling receptacle in accordance with an illustrative embodiment.

Turning now to FIG. 11, an illustration of a flowchart of a process for operating a refueling receptacle is depicted in accordance with an illustrative embodiment. This process may be used in aerial refueling environment 200 in FIG. 2 to perform a refueling process.

The process begins by controlling a number of latches of an aircraft refueling receptacle between an engaged position and a disengaged position with an actuation system (operation 1100). The aircraft refueling receptacle may be refueling receptacle 212 of FIG. 2. In some illustrative examples, the actuation system includes a hydraulic actuator. When sufficient hydraulic pressure is not provided to the hydraulic actuator, the number of latches of the aircraft refueling receptacle is in the engaged position.

The process then maintains the number of latches in the disengaged position by an elastic member responsive to the actuation system failing (operation 1102). Afterwards, the process terminates.

In some illustrative examples, the elastic member maintains the number of latches in the disengaged position by applying a tension force to a number of crank arms connected to the latches. In some illustrative examples, the elastic member is connected to a number of supports integral to the crank arms.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the process may further comprise inserting a refueling boom into the aircraft refueling receptacle and performing a refueling operation with the number of latches in the disengaged position through pressure refueling. Pressure refueling is a process in which pressure holds the refueling boom in place within the aircraft refueling receptacle.

As another example, the process may further comprise removing a first number of crank arms from a pre-existing aircraft refueling receptacle, and installing the elastic member and a second number of crank arms having a number of supports integral to the second number of crank arms in the pre-existing aircraft refueling receptacle. Should the actuation system fail in the pre-existing aircraft refueling receptacle, the number of latches would rest in the engaged position. By replacing the first number of crank arms of the pre-existing aircraft refueling receptacle, a conventional aircraft refueling receptacle may be retrofitted to provide the elastic member to hold the number of latches in the disengaged state should the actuation system fail.

Figure 12:
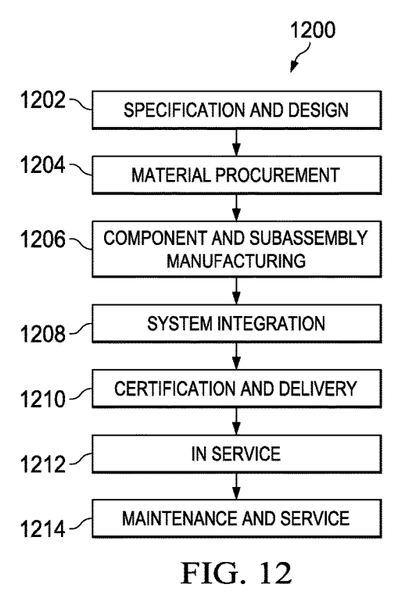
FIG. 12 is an illustration of a block diagram of an aircraft manufacturing and service method in accordance with an illustrative embodiment.
Figure 13:
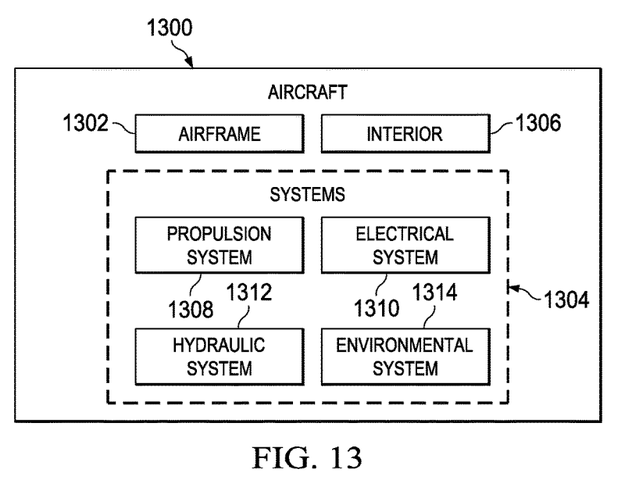
FIG. 13 is an illustration of a block diagram of an aircraft in which an illustrative embodiment may be implemented.

The illustrative embodiments of the disclosure may be described in the context of aircraft manufacturing and service method 1200 as shown in FIG. 12 and aircraft 1300 as shown in FIG. 13. Turning first to FIG. 12, an illustration of a block diagram of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 may go through certification and delivery 1210 in order to be placed in service 1212. While in service 1212 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of a block diagram of an aircraft is depicted in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1200 in FIG. 12.

One or more illustrative embodiments may be used during component and subassembly manufacturing 1206. In one example, refueling receptacle 212 including elastic member 233 may be installed in receiving aircraft 204 during component and subassembly manufacturing 1206. Further, number of crank arms 236 may replace conventional crank arms to retrofit a pre-existing refueling receptacle during maintenance and service 1214.

The aircraft refueling receptacle of the illustrative embodiments provides a mechanism to hold a number of latches in a disengaged position following an actuation system failure. An elastic member in the aircraft refueling receptacle biases a number of crank arms to hold a number of latches in the disengaged position. By holding the number of latches in the disengaged position, a refueling action may still take place despite an actuation system failure. Specifically, refueling may be conducted through pressure refueling.

The aircraft refueling receptacle may reduce costs associated with fueling attempts which are obstructed by latches in an engaged position. Further, the aircraft refueling receptacle may allow for longer flight times despite actuation system failure.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft receptacle comprising:
   an actuator connected to a number of latches, wherein the actuator is part of an actuation system connected to a power source; and
   a single elastic member connected to all the number of latches, the single elastic member configured to hold all the number of latches in a disengaged position when the actuator receives no power from the power source; such that the disengaged position comprises retention of the number of latches in a number of first cavities and prevention of the number of latches from extension into a second cavity of the aircraft receptacle, such that the second cavity comprises a refueling boom cavity.

2. The aircraft receptacle of claim 1 further comprising:
   a number of crank arms, wherein the actuator and the single elastic member are connected to the number of latches through the number of crank arms, and wherein rotating the number of crank arms moves the number of latches between an engaged position and the disengaged position.

3. The aircraft receptacle of claim 2, wherein the single elastic member is connected to a number of supports integral to the number of crank arms, such that a length of the single elastic member extends substantially perpendicular to a central axis of the aircraft receptacle.

4. The aircraft receptacle of claim 3, wherein the single elastic member is a tension spring.

5. The aircraft receptacle of claim 4, wherein the tension spring is connected to the number of supports by a number of spring spools.

6. The aircraft receptacle of claim 5, wherein the number of spring spools comprises a polymeric material.

7. The aircraft receptacle of claim 6, wherein the number of spring spools comprises at least one of a polyamide or an acetal resin.

8. The aircraft receptacle of claim 4 further comprising:
   a housing substantially surrounding the tension spring.

9. An aircraft refueling receptacle system that comprises:
   an aircraft refueling receptacle configured to engage a refueling boom during flight; and
   a single elastic member connected to all of a number of latches, the single elastic member configured to hold, responsive to a loss of power from a power source to an actuation system connected to the number of latches the number of latches in a number of first cavities and prevent the number of latches from extending inside a second cavity of the aircraft refueling receptacle, such that the second cavity comprises a boom cavity.

10. The aircraft refueling receptacle system of claim 9, wherein the aircraft refueling receptacle comprises:
   an actuator connected to a number of crank arms, wherein the actuator is part of the actuation system;
   an elastic member connected to the number of crank arms; and
   the number of crank arms, the number of crank arms connected to a number of latches such that the single elastic member holds the number of latches in a disengaged position after failure of the actuation system.

11. The aircraft refueling receptacle system of claim 10, wherein the single elastic member is connected to the number of crank arms such that the number of latches bias to the disengaged position when the actuation system fails.

12. The aircraft refueling receptacle system of claim 10, wherein the aircraft refueling receptacle further comprises:
   a housing substantially surrounding the single elastic member.

13. The aircraft refueling receptacle system of claim 10, further comprising the single elastic member connected to a number of supports integral to the number of crank arms, such that a length of the single elastic member extends substantially perpendicular to a central axis of the aircraft refueling receptacle.

14. The aircraft refueling receptacle system of claim 13, wherein the single elastic member is a tension spring, and wherein the tension spring is connected to the number of supports by a number of spring spools.

15. The aircraft refueling receptacle system of claim 14, wherein the number of spring spools comprises a polymeric material.

16. The aircraft refueling receptacle system of claim 15, wherein the polymeric material comprises at least one of a polyamide or an acetal resin.

17. A method comprising:
   controlling a number of latches of an aircraft refueling receptacle between an engaged position and a disengaged position with an actuation system; and
   maintaining, responsive to the actuation system failing, all of the number of latches in the disengaged position via a single elastic member, such that maintaining the number of latches in the disengaged position comprises holding the number of latches in a number of first cavities and preventing the number of latches from extending into a second cavity of the aircraft refueling receptacle, wherein the second cavity is a boom cavity.

18. The method of claim 17, wherein the single elastic member maintains the number of latches in the disengaged position by applying a tension force to a number of crank arms connected to the number of latches.

19. The method of claim 18, wherein the single elastic member is connected to a number of supports integral to the number of crank arms.

20. The method of claim 17 further comprising:
   inserting a refueling boom into the aircraft refueling receptacle; and
   performing a refueling operation with the number of latches in the disengaged position through pressure refueling.

21. The method of claim 17 further comprising:
   removing a first number of crank arms from a pre-existing aircraft refueling receptacle; and
   installing the single elastic member and a second number of crank arms having a number of supports integral to the second number of crank arms in the pre-existing aircraft refueling receptacle.

* * * * *

UNITED STATES PATENT AND TRADEMARK OFFICE
CERTIFICATE OF CORRECTION

PATENT NO. : 10,239,631 B2
APPLICATION NO. : 14/797796
DATED : March 26, 2019
INVENTOR(S) : Lewis et al.

It is certified that error appears in the above-identified patent and that said Letters Patent is hereby corrected as shown below:

In the Claims

Column 10, Line 66-67, remove one instance of "the number of latches"

Column 11, Line 10, remove the first instance of "the number of crank arms"

Signed and Sealed this
Twenty-fifth Day of June, 2019

Andrei Iancu
*Director of the United States Patent and Trademark Office*